J. W. PETTIJOHN.
NUT LOCK.
APPLICATION FILED NOV. 30, 1915.
1,184,771. Patented May 30, 1916.
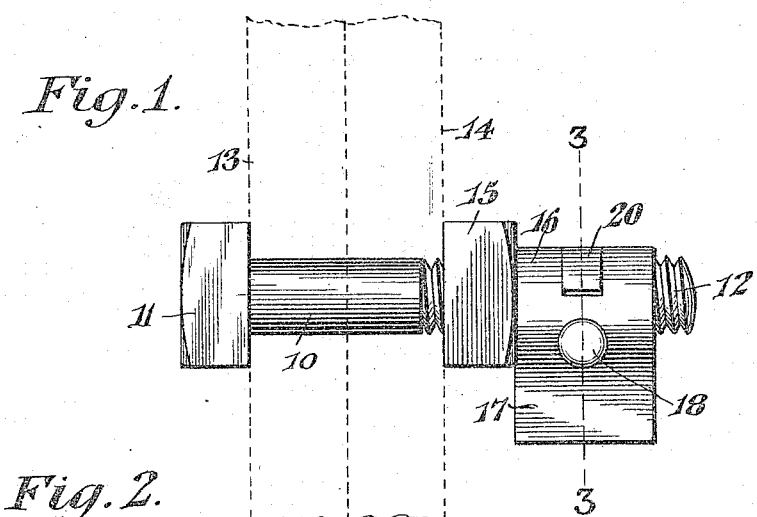
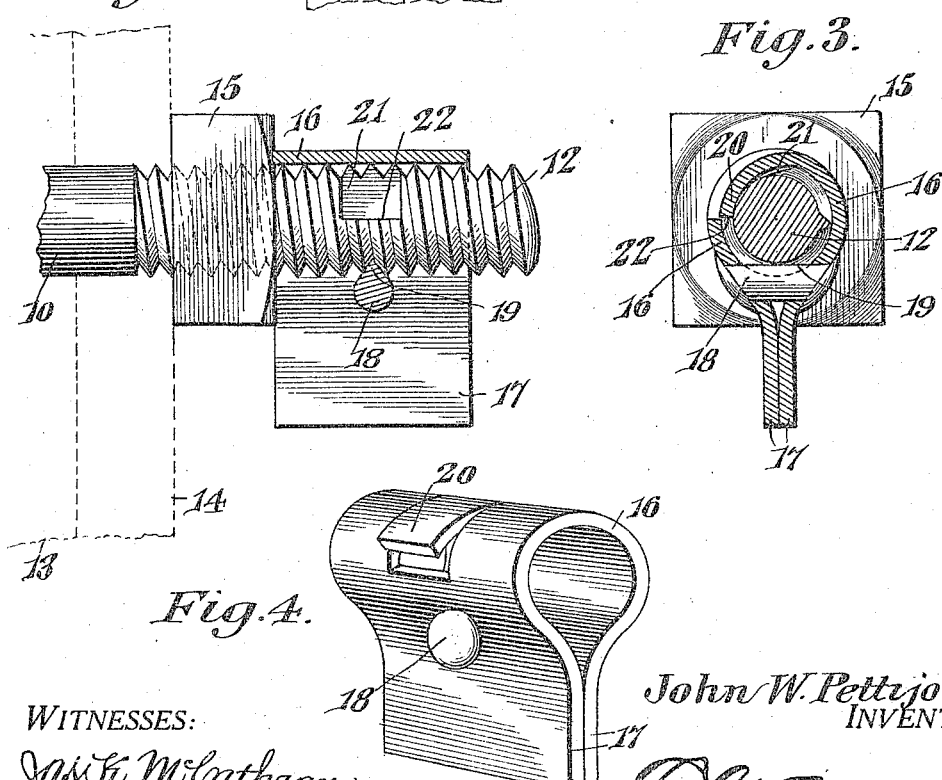
WITNESSES:
John W. Pettijohn,
INVENTOR
BY
Attorney

UNITED STATES PATENT OFFICE.

JOHN W. PETTIJOHN, OF MONTESANO, WASHINGTON.

NUT-LOCK.

1,184,771.  Specification of Letters Patent.  Patented May 30, 1916.

Application filed November 30, 1915. Serial No. 64,339.

*To all whom it may concern:*

Be it known that I, JOHN W. PETTIJOHN, a citizen of the United States, residing at Montesano, in the county of Grays Harbor and State of Washington, have invented a new and useful Nut-Lock, of which the following is a specification.

This invention relates to an improvement in nut locks, and has for an object to provide a universally applicable nut lock for all kinds of nuts and bolts, and nuts and bolts formed of all kinds of materials, and to provide a nut lock which may be used in practically every position and place in which a nut or bolt is employed.

It is another object of the present invention to provide a nut lock comprising but few parts, which may be easily applied, and which does not require any peculiar construction of the nut or bolt, or any peculiar formation of the parts through which the bolt passes, and against which the nut is adapted to engage.

Other objects and advantages of this invention will be clearly brought out in the following description of the present preferred embodiment of the invention, the same being illustrated in the accompanying drawing, wherein:—

Figure 1 is a side elevation of the improved nut lock, as applied to a nut and bolt, the dotted lines showing a pair of plates or the like through which the bolt is passed. Fig. 2 is a detail enlarged sectional view, taken longitudinally through the nut lock, and showing the outer end of the bolt passing through the same. Fig. 3 is a transverse section on the line 3—3 of Fig. 1. Fig. 4 is a detail perspective view of the locking sleeve employed, showing the position of the tongue and the thread engaging rivet.

Referring to this drawing, 10 designates a bolt of ordinary construction having the head 11 and the threaded shank 12. In Figs. 1 and 2, the bolt 10 is disclosed as passing through a pair of plates or other members 13 and 14, which are to be secured together. The head 11 of the bolt rests against the member 13, while the shank thereof projects outwardly from the member 14. A nut 15 of the usual type or form is threaded upon the shank 12 and tightened up against the member 14 to hold the two members together.

For locking the nut 15 upon the bolt 10, the present invention provides a sleeve 16 adapted to surround the shank 12 of the bolt, and which is split at one side and provided with a pair of outturned flanges 17 adapted to be drawn together to contract the sleeve about the shank 12 and bind the locking sleeve in position. This sleeve 16 is adapted to be slid over the shank 12 and up against the outer face of the nut 15, as shown in Figs. 1 and 2. The flanges 17 are held together to tighten the sleeve 16 by a rivet 18, the same passing through the inner ends of the flanges 17 and being headed against the opposite outer faces of the flanges, as clearly shown in Figs. 1, 3 and 4. From Figs. 2 and 3, it will be noted that the inner side of the rivet 18 is provided with a sharp projecting edge 19 extending longitudinally of the rivet, and adapted to bind in between the threads of the shank 12, so as to hold the sleeve from slipping longitudinally from the bolt.

The sleeve 16 is provided in one side with a cut out or stamped tongue 20 extending circumferentially of the sleeve and adapted to have its free end bent inwardly from the sleeve, as shown in Fig. 3, to engage in a recess 21 formed in the side of the shank 12 of the bolt, which recess 21 provides in the shank 12, a shoulder 22 at one side of the recess to receive thereagainst the flat extremity of the tongue 20. Thus, the shoulder 22 holds the sleeve 16 from retrograde movement upon the shank 12, so that any rotation of the sleeve 16 upon the bolt will be stopped by the end of the tongue 20 engaging the shoulder 22. It will be noted that the recess or slot 21 is of a width equal substantially to the width of the tongue 20, so that the ends of the recess engage the opposite flat edges of the tongue 20 and hold the sleeve 16 against longitudinal movement upon the bolt, and assists the sharp thread engaging edge 19 of the rivet to hold the sleeve 16 from slipping over the bolt. It will be noted that the shoulder 22 is formed at the outer side of the recess 21, or that side toward which the tongue 20 must be turned in rotating the sleeve 16 to remove it from the threaded shank 12. Any inward movement of the sleeve will be stopped by the abutting of the inner end of the sleeve against the outer face of the nut 15.

In applying the improved nut lock to the bolt 10 and nut 15, the bolt is inserted through the members 13 and 14, and the nut 15 is turned over the threaded shank 12 and tightened up against the member 14 to bind the members 13 and 14 together, as desired. The sleeve 16, which is open and has no rivet 18 therein, is slipped over the outer end of the shank 12 and moved up against the nut 15. The measurement is now taken of the distance between the outer face of the nut 15 and the tongue 20. The sleeve 16 is now pulled from the nut 15 and the measurement taken is laid off on the shank 12 to locate the desired position of the recess 21 to be formed in the shank 12. A cold chisel, or other suitable tool, is employed for cutting into the threads of the shank 12 to form the recess 21. It will be noted, however, that it is necessary to form the shoulder 22 in the outer end of the recess. This may readily and quickly be accomplished by driving the chisel down into the threads at the point where the shoulder 22 is to be formed and then splitting off the threads backwardly to produce the recess and the shoulder, and to bevel off the opposite edge of the recess, as shown in Fig. 3. The sleeve 16 is now slipped into place a second time and forced up against the nut 15. The tongue 20 is now struck inwardly to engage the end of the tongue in the recess 21, and in such position so as to engage against the shoulder 22 upon any turning of the sleeve 16 to unscrew the same from the shank 12. The rivet 18 is now passed through the flanges 17, the inner sharp edge 19 of the rivet being presented to the threads of the shank 12, and engaging between the threads to bind the sleeve 16 to the shank, and prevent the longitudinal movement of the sleeve thereon.

It will thus be seen that the improved nut lock provides against longitudinal pulling or slipping off of the sleeve 16 not only by means of the sharp edge of the rivet 18, but also by means of the opposite sides or edges of the tongue 20 engaging in the opposite ends of the recess 21. Also, the sleeve 16 is braced against any turning movement, which tends to remove the sleeve 16 from the nut 15, by the tongue 20 abutting against the shoulder 22 in the recess.

It will, of course, be understood that when there are any material differences in the sizes or diameters of the bolts, it is necessary to provide larger or smaller sleeves 16 to accommodate the bolts. The improved nut lock is adapted particularly for such uses as securing the nuts and bolts through the webs and fish plates at rail joints.

The structure and formation of the nut lock is such that it cannot be disturbed by vibration, and cannot be harmed or rendered useless by exposure to the elements. It will also be noted that the sleeve comprises but a sheet of metal which is bent into the desired form and stamped to provide the rivet receiving openings in the flanges and the tongue 20 in the body portion of the strip, and that by such formation the improved nut lock may be very economically manufactured and may be very easily handled in applying the same to the nuts and bolts. It, of course, is understood, however, that the sleeve may be formed by casting, or any other suitable manner, although it is preferred to make the same of sheet metal.

While the member 18 is disclosed and described as being in the form of a rivet, it is, of course, to be understood that any other suitable device may be used for contracting the sleeve upon the bolt, and for engaging the threads of the bolts to hold the sleeve from movement.

It is within the spirit of the invention to make such changes or modifications in the details of construction of the form above disclosed within the scope of the following claims.

What I claim is:—

1. The combination with a bolt and a nut threaded thereon, of a sleeve surrounding the threaded end of the bolt and abutting the nut, a tongue projecting inwardly from the sleeve for engagement in the threaded portion of the bolt, and a securing member passing through one side of the sleeve for contracting the same to bind the sleeve upon the bolt, and hold the tongue in the threaded portion of the bolt, said member having a sharp thread engaging edge at its inner side adapted to bind between the threads of the bolt.

2. In a nut lock, the combination with a bolt having a recess in the threaded portion thereof, and provided with a shoulder in the outer side of the recess, and a nut threaded on the bolt, of a sleeve engaging about the threaded end of the bolt and against said nut, a rivet passing through one side of the sleeve to clamp the latter upon the bolt, the rivet having an inwardly projecting portion engaging the threads of the bolt to retain the sleeve from longitudinal movement upon the bolt, and a tongue projecting inwardly from the sleeve for engagement in the recess and adapted to abut against said shoulder and the ends of the recess to retain the sleeve from rotary and longitudinal movement upon the bolt.

3. A nut lock, comprising a split sleeve having outturned flanges at its meeting ends, and adapted for engagement about the threaded end of a bolt, a tongue stamped from the body portion of the sleeve and extending inwardly for engagement into the threaded portion of the bolt, and a member passing through said outturned flanges to contract the sleeve upon the bolt and having a thread engaging portion adapted to bind in between the threads of the bolt.

4. The combination with a bolt having a nut thereon, and having a recess in one side of the threaded portion of the bolt providing shoulders at the ends and at the forward side of the recess, of a sleeve engaging over said threaded portion and against the nut, and a tongue carried by the sleeve engaging in the recess and abutting at its end and at its sides against said end and lateral shoulders to retain the sleeve from sliding longitudinally and turning upon the bolt.

5. In a nut lock, the combination with a bolt, and a nut on the bolt, of a sleeve fitting over the bolt against the nut, and a tongue carried by the sleeve, said bolt having a recess cut in the side thereof at a distance from said nut equal to the distance between the end of the sleeve abutting the nut and the tongue, said tongue being adapted to be bent inwardly into the recess to retain the sleeve from turning, and from longitudinal movement on the bolt.

6. In a nut lock, the combination with a bolt, and a nut on the bolt, of a split sleeve surrounding the bolt and engaging against the nut, and having outturned flanges, and a securing member passing through the flanges to contract the sleeve upon the bolt, and having a sharp inner edge for engagement between the threads of the bolt to hold the sleeve on the bolt and against the nut.

In testimony that I claim the foregoing as my own I have hereto affixed my signature in the presence of two witnesses.

JOHN W. PETTIJOHN.

Witnesses:
 GEO. M. WADE,
 S. D. WININGER.

Copies of this patent may be obtained for five cents each, by addressing the "Commissioner of Patents, Washington, D. C."